United States Patent
Gural et al.

(10) Patent No.: US 11,580,191 B1
(45) Date of Patent: Feb. 14, 2023

(54) METHOD AND SYSTEM FOR CONVOLUTION

(71) Applicant: Xilinx, Inc., San Jose, CA (US)

(72) Inventors: Albert T. Gural, Clifton, VA (US); Michael Wu, Palo Alto, CA (US); Christopher H. Dick, San Jose, CA (US)

(73) Assignee: XILINX, INC., San Jose, CA (US)

( * ) Notice: Subject to any disclaimer, the term of this patent is extended or adjusted under 35 U.S.C. 154(b) by 1250 days.

(21) Appl. No.: 15/963,234

(22) Filed: Apr. 26, 2018

(51) Int. Cl.
*G06F 17/15* (2006.01)
*G06N 3/063* (2006.01)
*G06F 17/16* (2006.01)

(52) U.S. Cl.
CPC ............ *G06F 17/15* (2013.01); *G06F 17/16* (2013.01); *G06N 3/063* (2013.01)

(58) Field of Classification Search
CPC .......... G06F 17/15; G06F 17/16; G06N 3/063
See application file for complete search history.

(56) References Cited

U.S. PATENT DOCUMENTS

2017/0344876 A1* 11/2017 Brothers ............... G06F 17/153
2018/0293493 A1* 10/2018 Kalamkar ............ G06N 3/0445

OTHER PUBLICATIONS

Lavin, Andrew et al., "Fast Algorithms for Convolutional Neural Networks," Sep. 30, 2015, pp. 1-9, https://arxiv.org/abs/1509.09308.

Szegedy, Christian et al., "Inception-v4, Inception-ResNet and the Impact of Residual Connections on Learning," Proc of the 31st AAAI Conference on Artificial Intelligence, submitted Feb. 23, 2016, pp. 4278-4284.

Vincent, Kevin et al., "On Improving the Numerical Stability of Winograd Convolutions," Proc. of the International Conference on Learning Representations, Feb. 16, 2017, pp. 1-4.

* cited by examiner

*Primary Examiner* — Michael D. Yaary
(74) *Attorney, Agent, or Firm* — Patterson + Sheridan, LLP

(57) ABSTRACT

Method and system relating generally to convolution is disclosed. In such a method, an image patch is selected from input data for a first channel of a plurality of input channels of an input layer. The selected image patch is transformed to obtain a transformed image patch. The transformed image patch is stored. Stored is a plurality of predetermined transformed filter kernels. A stored transformed filter kernel of the plurality of stored predetermined transformed filter kernels is element-wise multiplied by multipliers with the stored transformed image patch for a second channel of the plurality of input channels different from the first channel to obtain a product. The product is inverse transformed to obtain a filtered patch for the image patch.

20 Claims, 19 Drawing Sheets

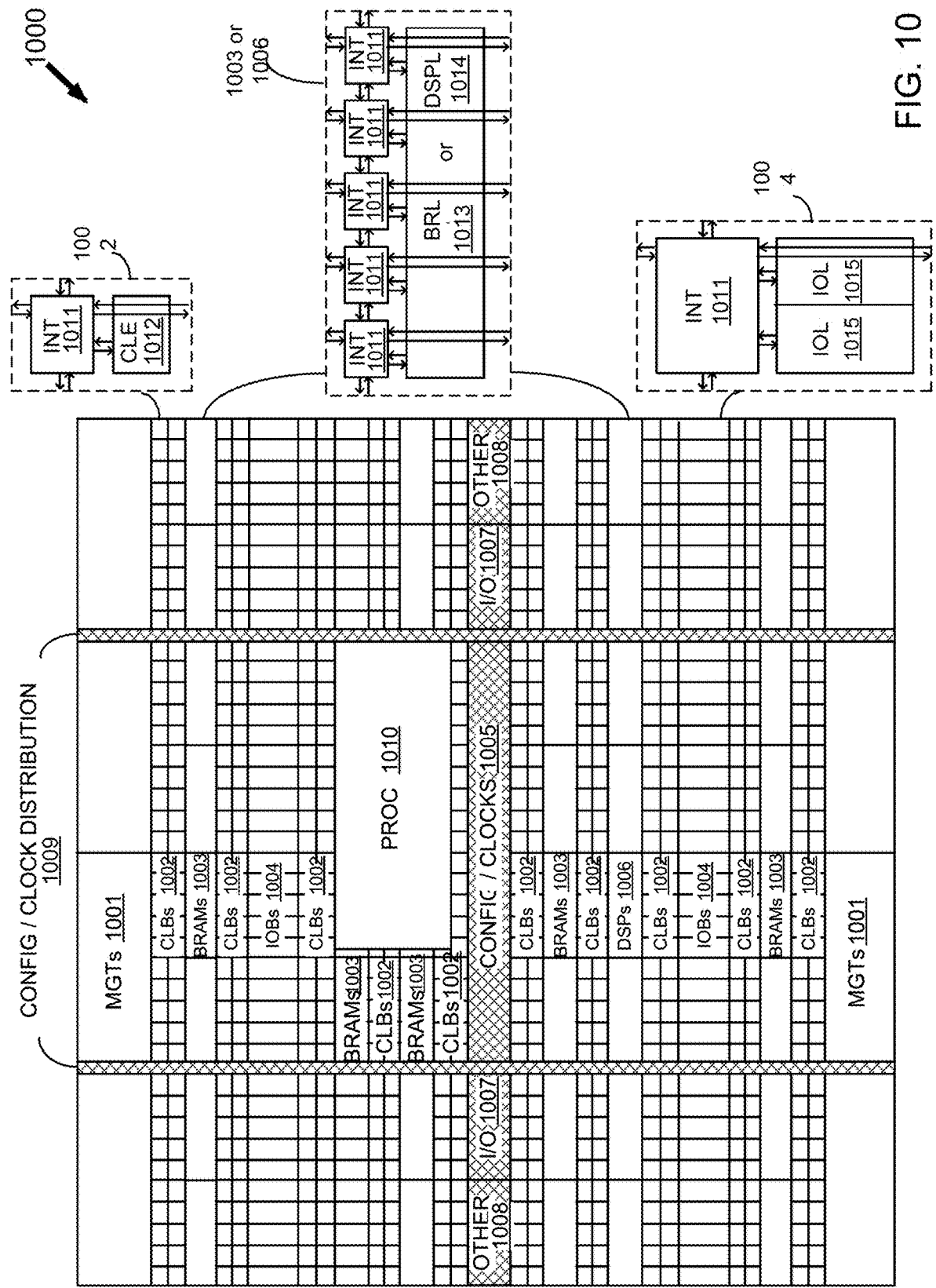

METHOD AND SYSTEM FOR CONVOLUTION

TECHNICAL FIELD

The following description relates to integrated circuit devices ("ICs"). More particularly, the following description relates to method and system for convolution for an IC.

BACKGROUND

Convolutional neural networks, sometimes referred to as "convnets" or "CNNs", implemented in ICs have many applications, including in image processing, computer vision, and image classification. Recently, convolutional neural networks have outperformed humans on an image classification task known as ImageNet. This image classification task involves substantially large convolutional neural networks with many convolutional layers involving a massive amount of computational resources. Hence, it is desirable to provide a less multiplication intensive convolutional neural network to reduce multiplier resource usage and/or power consumption.

SUMMARY

A method relates generally to convolution. In such a method, an image patch is selected from input data for a first channel of a plurality of input channels of an input layer. The selected image patch is transformed to obtain a transformed image patch. The transformed image patch is stored. Stored is a plurality of predetermined transformed filter kernels. A stored transformed filter kernel of the plurality of stored predetermined transformed filter kernels is element-wise multiplied by multipliers with the stored transformed image patch for a second channel of the plurality of input channels different from the first channel to obtain a product. The product is inverse transformed to obtain a filtered patch for the image patch.

A system relates generally to convolution. In such a system, a memory system is configured to read out a first transformed filter kernel, a second transformed filter kernel, and image data. Convolutional transform circuitry is configured to receive the image data to provide transformed image data. An element-wise multiply accumulator is configured to element-wise multiply: the first transformed filter kernel and the transformed image data to obtain a first product; and the second transformed filter kernel and the transformed image data to obtain a second product. The element-wise multiply accumulator is configured to add the first product and the second product to obtain an accumulated sum. Inverse convolution transform circuitry is configured to inverse transform the accumulated sum to provide filtered output data for the image data.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIGS. 3-1 through 3-4 collectively are a block-flow diagram depicting an exemplary convolution using Winograd transforms.

FIG. 4 is a flow diagram depicting an exemplary convolution flow using Winograd transforms.

FIGS. 8-1 through 8-10 are matrix diagrams depicting exemplary transform matrices A, G, B.

FIG. 9 is a block diagram depicting a convolution system.

FIG. 10 is a simplified block diagram depicting an exemplary columnar Field Programmable Gate Array ("FPGA") architecture.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

Figure 1:
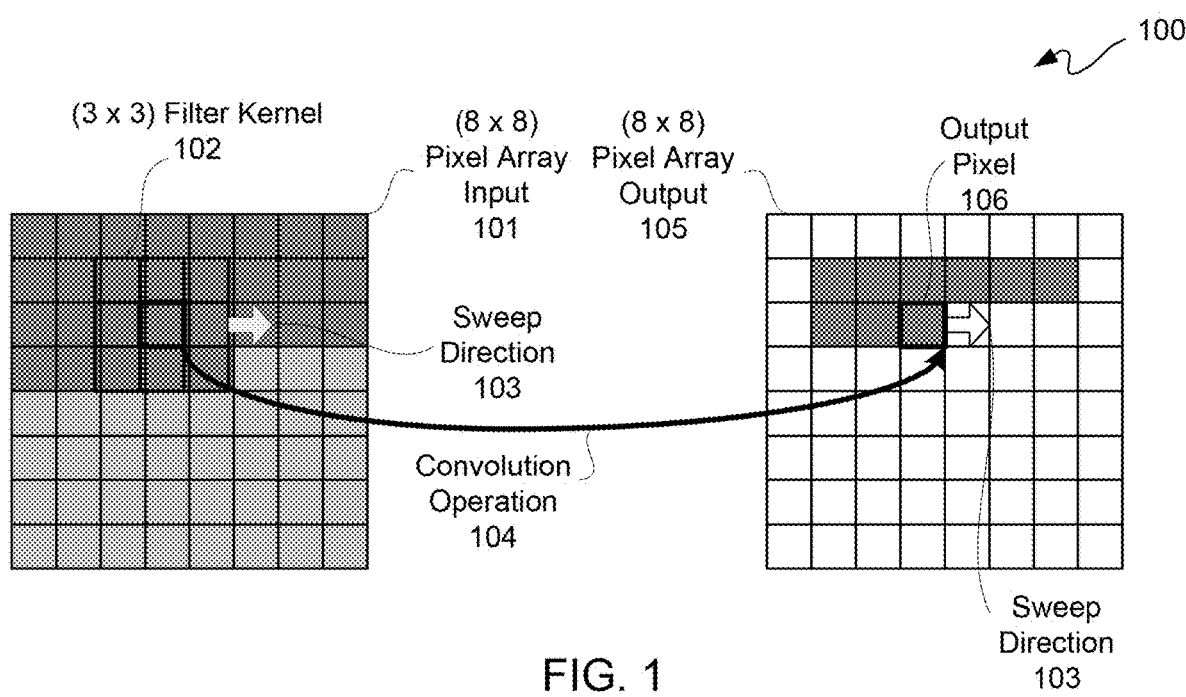
FIG. 1 is a block-flow diagram depicting an exemplary conventional convolution.

FIG. 1 is a block-flow diagram depicting an exemplary conventional convolution 100. In this example, a pixel array input 101 is processed with a filter kernel 102. In this example, pixel array input 101 is an 8-by-8 ("8×8") pixel array input, and filter kernel 102 is a 3-by-3 ("3×3") pixel filter kernel. However, in other examples, these and/or other dimensions of pixel input and/or kernel filter may be used.

In this example, kernel filter 102 is swept from left-to-right across the page, as generally indicated by a sweep direction arrow 103. Darker pixel blocks in pixel array input are used to indicate at least one pass by kernel filter 102 has already/is being performed for a convolution operation 104 to provide corresponding output pixels in pixel array output 105.

For a current position of filter kernel 102, an output pixel 106 may be provided in pixel array output 105 by a convolution operation 104 for the nine pixels currently overlaid by kernel filter 102 in pixel array input 101. In this example, pixel array output 105 is an 8-by-8 ("8×8") pixel array; however, in other examples, this or another size for pixel array output 105 may be used.

This is an example how a "naïve" convolution operation 104 is conventionally performed. In this example, filter kernel 102 is swept across all input pixels of pixel array input 101 from left-to-right and progressively down each row after a previous row is processed. At each input pixel, pointwise multiplication is performed between input pixels of pixel array input 101 overlaid by kernel filter 102 and filter kernel 102, also known as a filter kernel matrix. A sum of these pointwise multiplications is a resulting output pixel, such as output pixel 106, in pixel array output 105.

Along those lines, for each output pixel in pixel array output 105 generated by a naïve convolution operation 104, there are nine (9) multiplications for a 3-by-3 filter kernel. In general, the total number of multiplications for a "naïve" convolution operation 104 is the number of output pixels 106 in pixel array output 105 multiplied by the number of filter elements in filter kernel 102.

The number of multiplications for a "naïve" convolution can be a limiting factor in terms of computational effort and resources. Along those lines, convolutional neural networks or "convnets" or "CNNs" spend a significant amount of power, time and resources executing multiplications for convolution operations. The number of multiplications may negatively impact latency and power consumption, in additional to negatively impacting resource utilization.

Described below is a hardware accelerated large filter ("HALF") convolutional neural network and associated convolution based on a Winograd transform. Such a HALF convnet allows for simultaneously computing large blocks of convolutions using fewer non-constant multiplications than would be present in a "naïve" convolution of equivalent scale. By reducing the number of multiplications used to perform convolutions, fewer resources, less power consumption, and/or reduced latency may result. Furthermore, such HALF convolutions may significantly reduce the number of multiplications for a "naïve" convolution, while maintaining a high numerical stability and transform computability used for low-precision hardware feasibility. In other words, less expensive hardware may be used than in the past.

With the above general understanding borne in mind, various configurations for HALF convolution are generally described below.

For a Winograd algorithm using an F(m, r), namely a finite impulse response filter ("FIR") F with m outputs and r taps, a Winograd minimal number of multiplications may be less than m multiplied by r. For example, an F(2, 3), conventional naïve convolution would involve 2×3, or 6, multiplications. However, such an example in a Winograd transform may look like Equation (1), as follows:

$$F(2,3) = \begin{bmatrix} d_0 & d_1 & d_2 \\ d_1 & d_2 & d_3 \end{bmatrix} \begin{bmatrix} g_0 \\ g_1 \\ g_2 \end{bmatrix} = \begin{bmatrix} m_1 + m_2 + m_3 \\ m_2 - m_3 - m_4 \end{bmatrix}. \tag{1}$$

In this example, this matrix multiplication is a convolution. For example, d values in Equation (1) may be pixel input data, and g values may be FIR filter coefficient values.

However, Winograd observed the following equalities for m values in Equation (1):

$$m_1 = (d_0 - d_2)g_0; \tag{2}$$

$$m_2 = (d_1 + d_2)\frac{g_0 + g_1 + g_2}{2}; \tag{3}$$

$$m_3 = (d_2 - d_1)\frac{g_0 - g_1 + g_2}{2}; \text{ and} \tag{4}$$

-continued $$m_4 = (d_1 - d_3)g_2. \tag{5}$$

In other words, by finding m values using Equations (2) through (5), a less multiplication resource intensive solution may be obtained although some addition operations are added.

A Winograd transform may be written in matrix form, such as for a fast filtering algorithm, as follows:

$$Y = A^T[(Gg) \odot (B^T d)], \tag{6}$$

where "$\odot$" in Equation (6) indicates element-wise multiplication. Again, values of g may be filter coefficients, and values of d may be input pixel data values. A one-dimensional Winograd transform for F(m,r) may be nested within itself to obtain a two-dimensional Winograd transform for F(m×m, r×r), as follows:

$$Y = A^T[(GgG^T) \odot (B^T dB)]A, \tag{7}$$

where scalar g is for an r×r filter and data d is for an (m+r−1)×(m+r−1) image matrix. As matrices $A^T$, G, and B for a Winograd transform of Equation (6) and matrices A, $A^T$, G, $G_T$, B, and $B^T$ for a Winograd transform of Equation (7) is known for an F(2×2, 3×3), it is not described herein in unnecessary detail.

The above nesting technique may be expressed more generally for filters and outputs as F(m×n, r×s), namely by nesting an algorithm for F(m,r) with an algorithm for F(n,s). In other words, for m×n outputs of an FIR filter, F may be provided from r×s FIR filter taps, which FIR filter may be expressed as F(m×n, r×s).

Again, the number of multiplications may be reduced by using a Winograd transform in comparison to a conventional "naïve" convolution of equivalent scale. Additionally, a Winograd transform may be used to simultaneously generate blocks of outputs for multiple channels.

Figure 2:
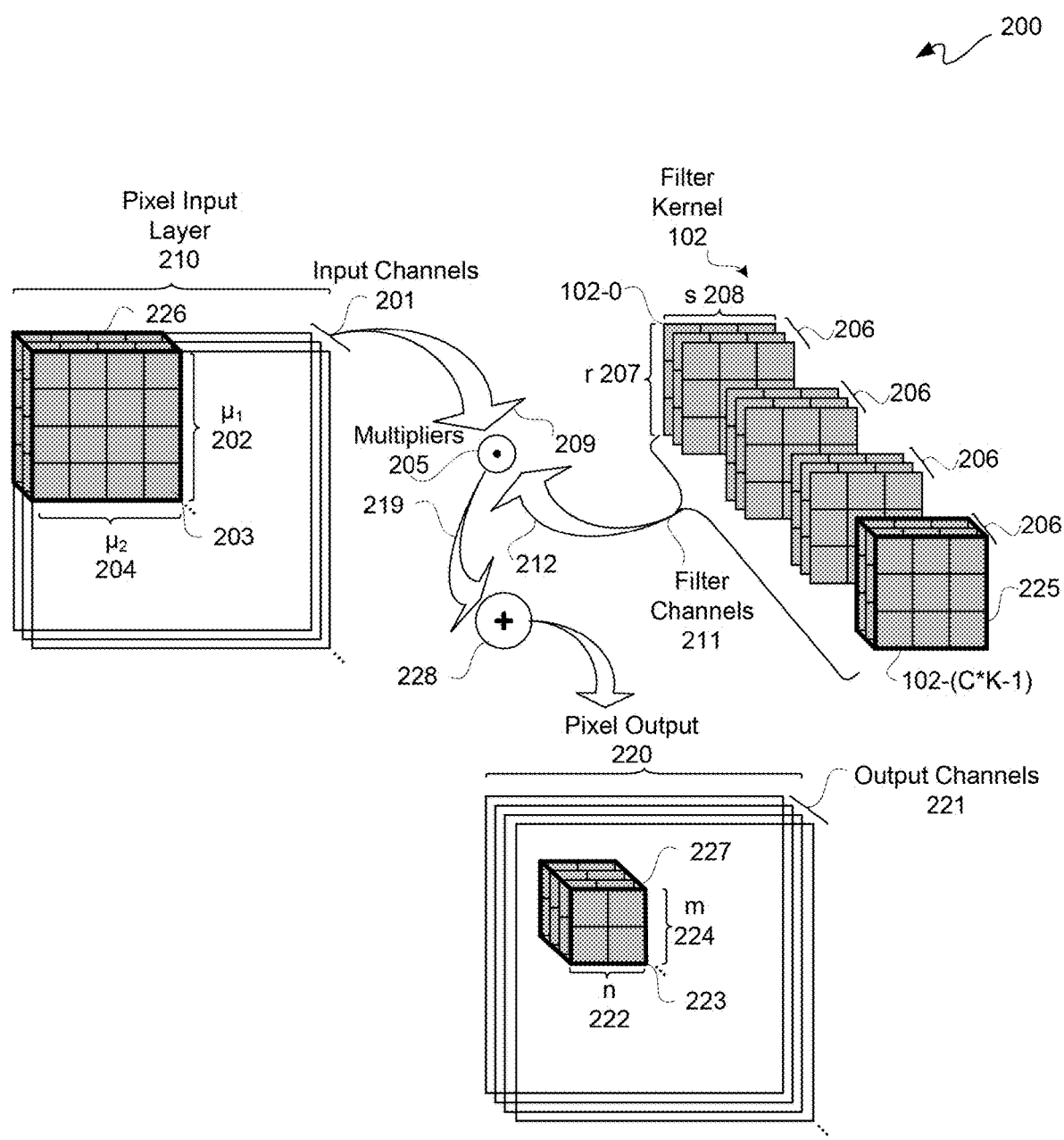
FIG. 2 is a block-flow diagram depicting an exemplary block convolution.

FIG. 2 is a block-flow diagram depicting an exemplary block convolution 200. In this example, pixel input layer 210 is depicted as being provided on C input channels 201. Each of such C input channels 201 may include a same $\mu_1 \times \mu_2$ image matrix 203 though for different parameters.

For example, a photograph stored on a cell phone may be processed with three channels for color, such as one each for red-green-blue ("RGB") for example. Of course, other colors or other image parameters may be used in other examples. Moreover, more than three channels may be used. In some instances, 64 or 128 channels are used to process different parameters of an image, such as separate channels for different colors, different image features, and/or different image processing techniques. For example, a Gaussian blur may be applied to all colors or a subset of colors of an image. Other examples of filtering may include positions of horizontal and vertical lines, and positions of shapes (e.g., circles, squares, rectangles, etc.), among other examples.

In this example, a 4×4 pixel matrix is used for each $\mu_1 \times \mu_2$ image matrix 203. A filter as described herein may, though need not, be spreadable. In this example, such a filter is an r-by-s ("r×s") matrix. An input size, namely size of $\mu_1 \times \mu_2$ image matrix 203, is sized as (r+m−1)×(s+n−1), respectively for $\mu_1$ 202 equal to m+r−1 and $\mu_2$ 204 equal to n+s−1. Output matrix 223 is an n×m matrix. An operation which produces a m×n size output matrix with a r×s filter matrix may be referred to as F(m×n, r×s), which may be used for a convolution, such as with an FIR filter for example.

Furthermore, even though three input channels 201 are depicted for C equal to 3, in other examples fewer or more than three input channels 201 may be used to provide a channel depth C. In another example, there may be a K set of filters, each with C channels for a layer, and there may be K channels for a subsequent layer.

Each convolution operational layer may have a channel depth C. Moreover, in some convolutional neural networks architectures, channel depths may range from 32 to 256 channels for convolutional layers, which convolutional layers may follow RGB or other image color filter processing for example.

Each filter kernel 102 may be an r 207-by-s 208 pixel filter kernel, for r and s positive integers greater than zero. Thus, r and s may be dimensions of a pixel for a filter kernel. In this example, each filter kernel 102 is illustratively depicted as a 3×3 pixel filter kernel to continue the above example though other filter kernel sizes may be used in other examples. Each image matrix 203 of pixel input layer 210 may be element-wise (or pointwise) multiplied by multipliers 205 configured for element-wise multiplication by a corresponding kernel filter 102 for each of C input channels 201.

For K output channels 221, element-wise multiplication conversion involves C input channels multiplied by K output channels in order to have C*K filter kernels 102 for such conversion. Accordingly, for K output channels 221 and C input channels 201, there may be K corresponding "filter channels" 211 for kernel filters 102-0 through **102-(C*K−1). For example, for K equal to 4 and C equal to 3, there may be 12 filter kernels 102 for 4 filter channels 211**. Of course, in other examples K may be fewer or more than 4.

There may be filter kernels 102-0 through **102-(C*K−1) for C and K positive integers greater than zero. In other words, each set 206 of filter kernels 102 may have C filter kernels 102 each, and there may be K sets 206 of filter kernels 102 corresponding to K filter channels 211**.

Pixel input layer 210 of C input channels 211 may be element-wise multiplied by multipliers 205 with kernel filters 102 of K filter channels 211, as generally indicated with arrows 209 and 212, respectively, for providing pixel output 220, as generally indicated with arrow 219. Pixel output 220 may have K output channels 221. Each output matrix, which may be an n 222-by-m 224 dimensioned pixel, may be in a corresponding output channel of K output channels 221. To obtain such an output, a summation across a set of filters may be performed. Along those lines, an input volume ((r+m−1)×(s+n−1)×C) may be multiplied by a filter set (r×s×C) which results in an n×m×C volume, and such resulting volume may be summed over C to get an n×m matrix. For K filters, an output size of n×m×K may be obtained, namely a summation for each of such K output channels resulting in K summations and thus an output volume n×m×K.

Accordingly, each output matrix 223 corresponds to a convolution of a set of C input matrices 203 with a set of C kernel filters 102. In other words, each filter kernel may be thought of as a 3-dimensional (3D) kernel filter 225 of dimensions r×s×C, for r, s, and C all positive integers greater than zero, and each input matrix may be thought of as a 3D input block of matrices ("matrix block") 226 of dimensions $\mu_2 \times \mu_1 \times C$. Such 3D filter kernel 225 may be element-wise multiplied with multipliers 205 and then summed with adders 228 such that a 3D input matrix block 226 of pixel input layer 210 generates an output matrix 223 in a 3D output matrix block 227 of dimension n×m×K, namely an output matrix 223 in an output channel of K output channels 221. However, it should be understood that transforms and inverse transforms are performed on a 2D-basis.

Figures 1, 3:
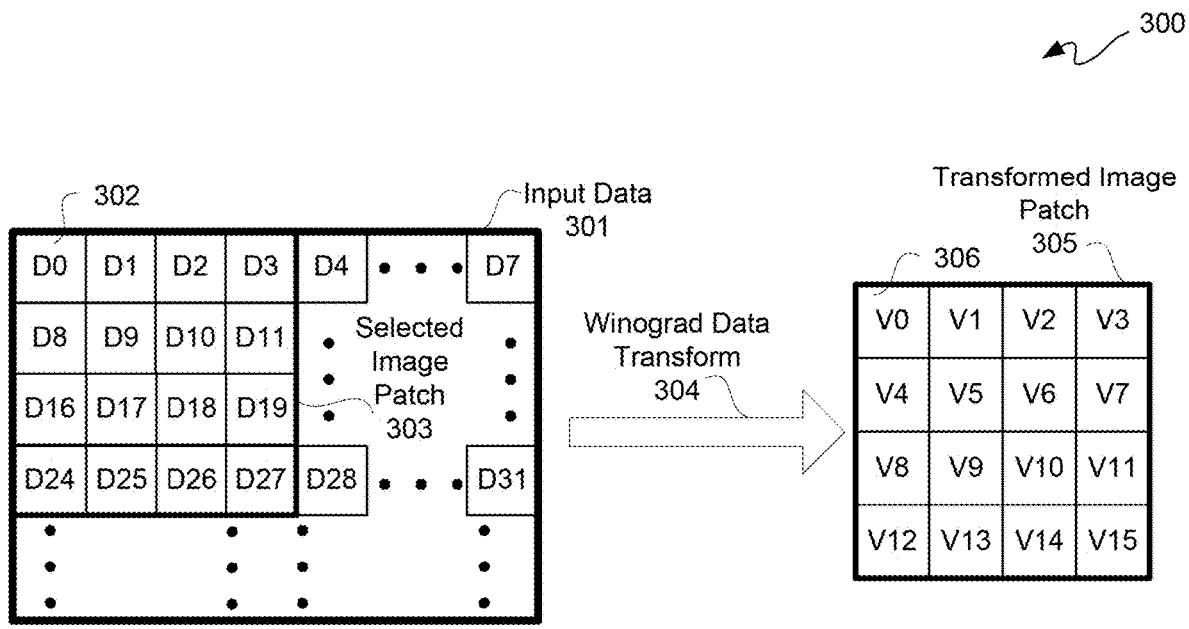
Figures 2, 3:
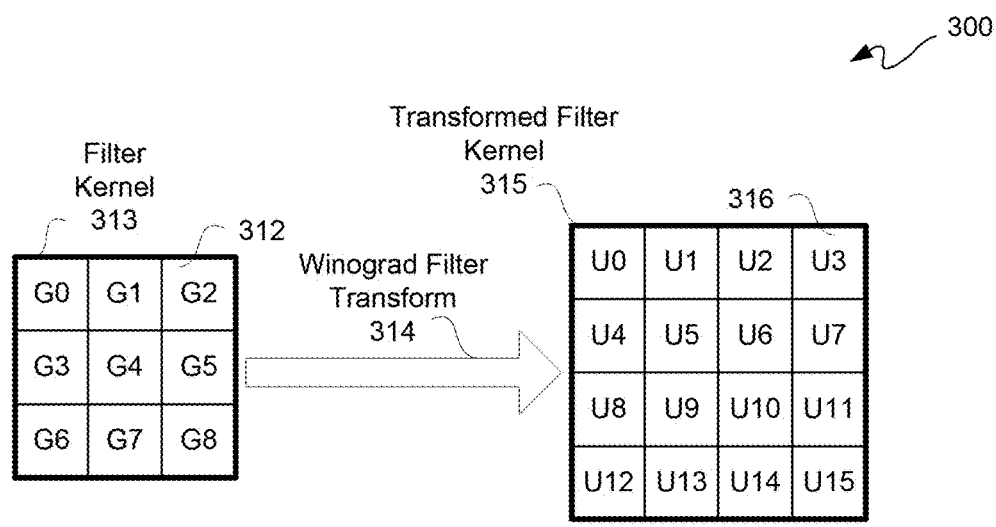
Figure 3:
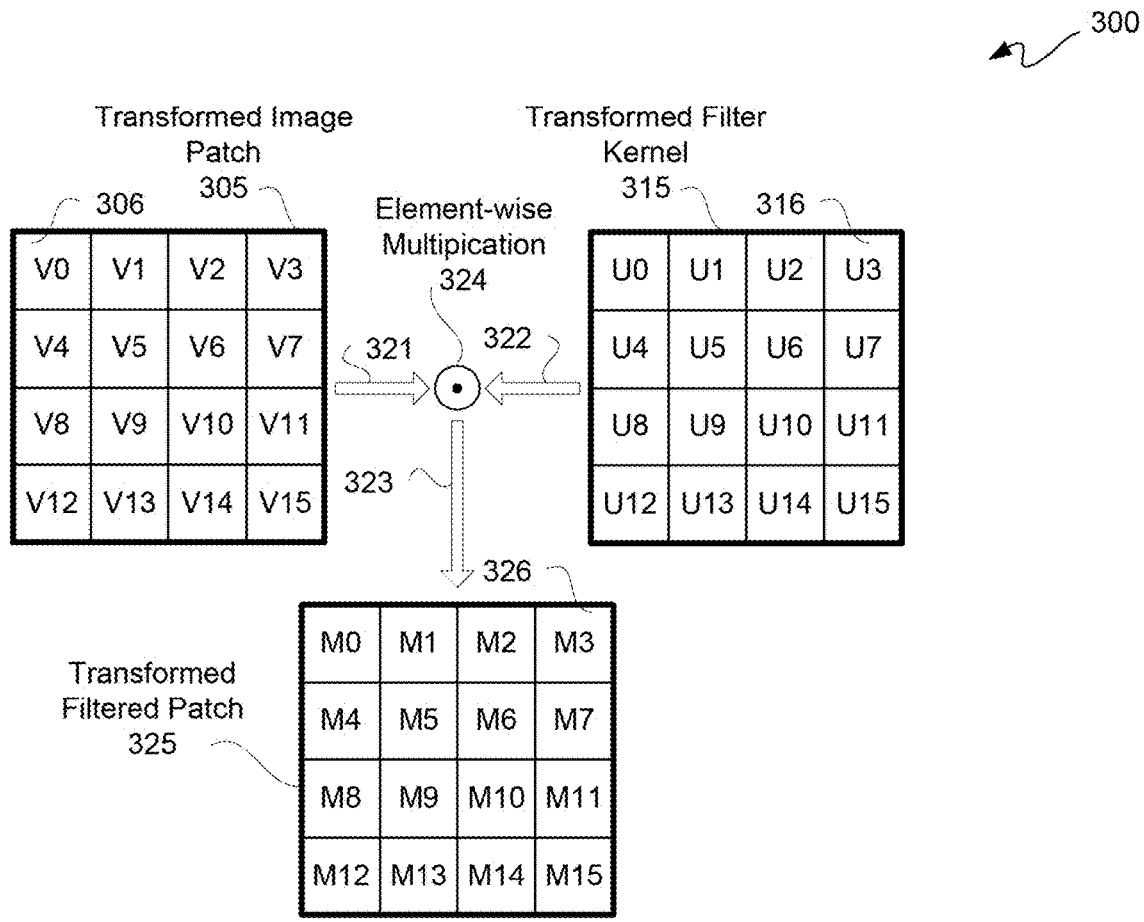
Figures 3, 4:
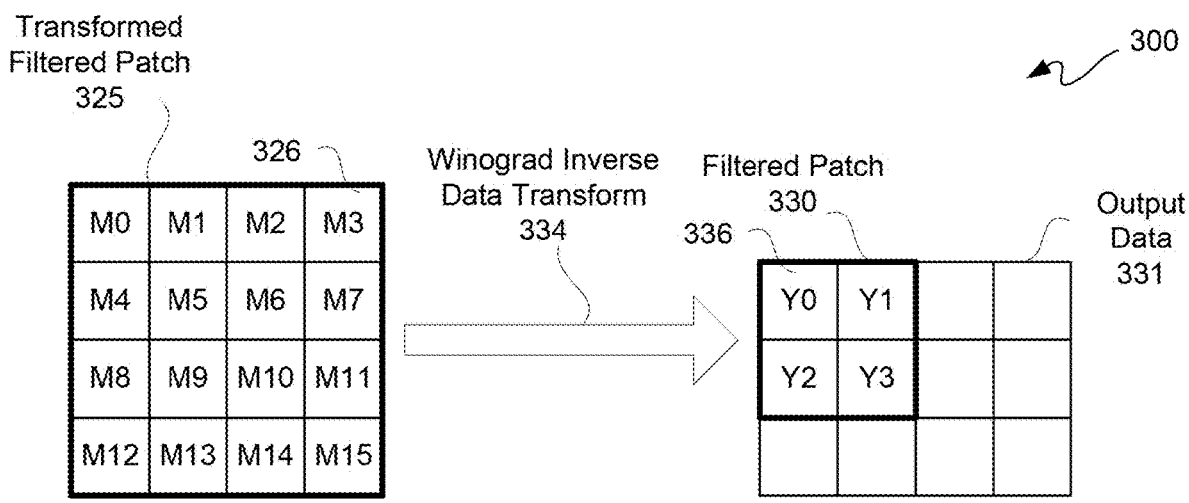
Figure 4:
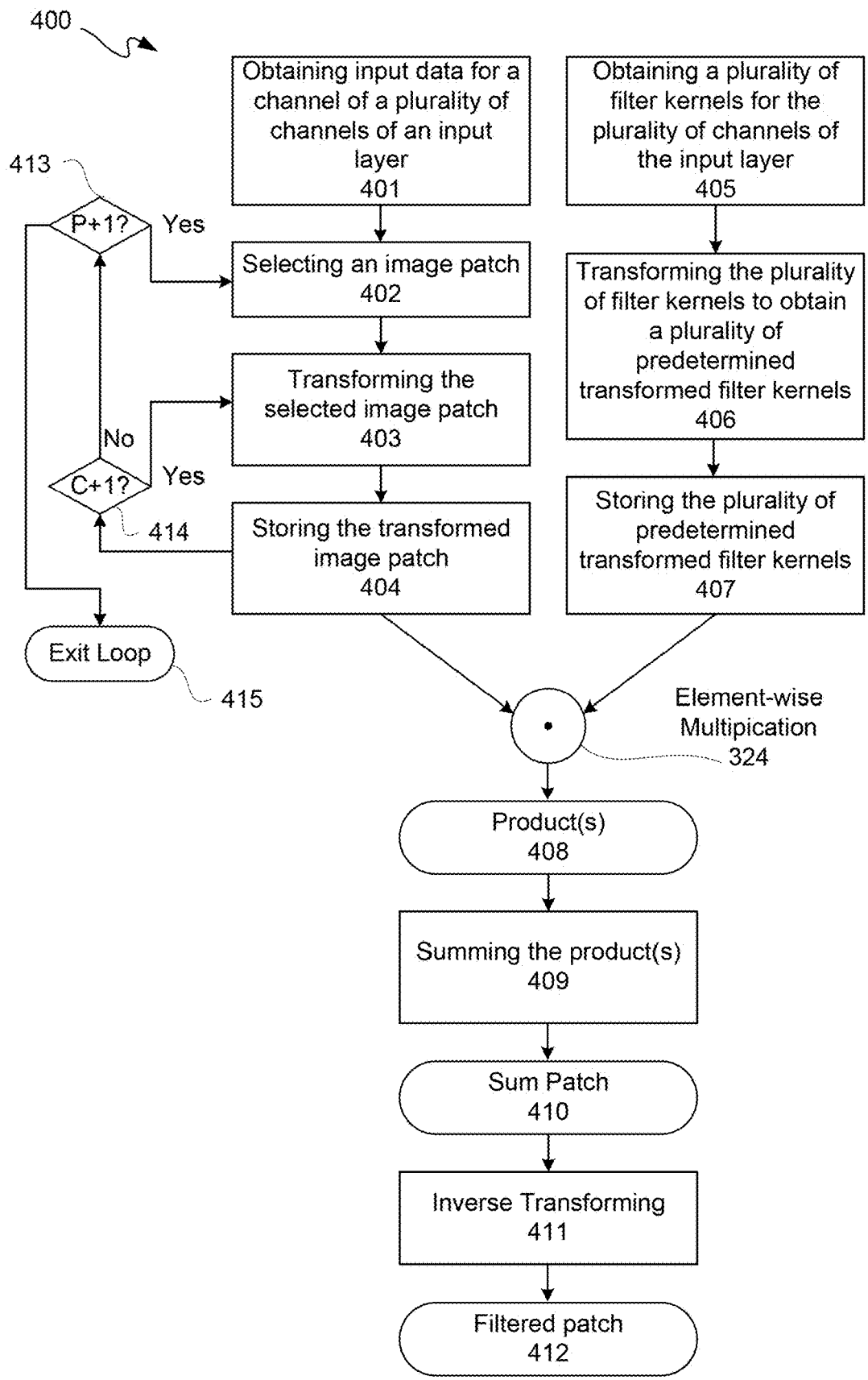

FIGS. 3-1 through 3-4 ("FIG. 3") collectively are a block-flow diagram depicting an exemplary convolution 300 using Winograd transforms. FIG. 4 is a flow diagram depicting an exemplary convolution flow 400 using Winograd transforms. With simultaneous reference to FIGS. 3 and 4, convolution 300 and convolution flow 400 are further described.

With reference to FIGS. 3-1 and 4, at 401 input data 301, which may be a picture image for example, may be tiled to provide data for a Winograd data transform. Such input data 301 in the example is for a single channel, but may be for a plurality of C channels of an input layer, such as pixel input layer 210 of FIG. 2 for example, in another example.

At 402, an image patch 303 may be selected from input data 301, which may be followed by a succession of other image patches from pixel input layer 210 for example for an input channel associated with such selected image patch 303. Such an image patch 303 selected from input data 401 may be for an input channel of a plurality of C input channels of such an input layer. This succession of selections may be pipelined or otherwise pushed along; however, for purposes of clarity by way of example and not limitation, a single selection is described as follow-on selections follow from such description.

In this example, a cell 302 of data D0 of image data of input data 301 is a starting point for a first selected image patch 303. Moreover, in this example, a 4×4 image patch is selected from input data 301. However, in other examples, these or other starting points and/or other patch sizes may be used.

Selected image patch 303 includes data cells D0-D3, D8-D11, D16-D19, and D24-D31, wherein each row of input data 301 is 8 cells long. However, in other examples, this or another row length of input data 301 may be used. For purposes of clarity by way of example and not limitation, it is assumed that data cells 302 of selected image patch 303 may correspond to a 4×4 pixel matrix selection on a single channel. However, in other examples, a data cell 302 may not be a single pixel of image data and/or may not be for a single channel. Along those lines, transforms, as well as inverse transforms, are for two dimensional patches, as described below in additional detail.

At 403, selected image patch 303 may be transformed to obtain a transformed image patch. Along those lines, at 403 a selected image patch 303 may be input to a Winograd transform for a Winograd data transform at 304 to obtain a transformed image patch 305. Transformed image patch 305 may include transformed data cells 306. Continuing the example of a 4×4 image patch 303, transformed image patch 305 may have transformed data cells V0-V15 sequentially from a first-to-a last row of a 4×4 matrix.

Operations with reference to FIG. 3-1 may be for a $B^T dB$ operation in Equation (7). At 404, a transformed image patch 305 may be stored for use on each of K output channels of a plurality of output channels. By storing transformed image patch 305, subsequent transforms at 403 may be avoided for multiple output channels. Thus, a first selected input channel selected by selection of an image patch 303 at 402 may be used for all K output channels.

A check may be made at 414 for another input channel, namely C+1. If another input channel is determined to be selectable at 414, then at 403 such image patch selected at 402 may be transformed for another input channel. If, however, at 414 it is determined that all input channels for current selected image patch of input data have been selected, a determination at 413 may be made to determine whether another image patch, namely P+1, is selectable. If another image patch is determined to be selectable at 413, then at 402 another image patch may be selected for input data obtained at 401. If, however, at 413 it is determined that all image patches for a current input data have been selected, transformed, and stored, then a channel-patch nested loop may be exited at 415.

Of course another set of input data may be obtained at 401 for subsequent processing. However, it should be understood that by transforming a selected image patch for use by all K output channels for a selected $C_i$ input channel or all input channels, processing latency may be reduced. The latter of which may be more efficient with respect to latency.

In another example, order of operations at 413 and 414 may be reversed. In other words, all patches for an input channel may be processed before proceeding to a next input channel. However, this may be less efficient with respect to latency.

Before operations associated with FIG. 3-1 are performed, operations associated with FIG. 3-2 as corresponding with operations 405-407 of FIG. 4 may be performed.

At 405, a plurality of filter kernels for such C input channels of an input layer may be obtained. Along those lines, a filter kernel 313 having a matrix of filter scalar or other coefficients G may be obtained. In this example, filter kernel 313 is a 3×3 matrix of filter cells 312. However, in other examples, this or another filter kernel size may be used. In this example, filter cells 312 may include filter coefficients G0-G8 sequentially from a first-to-a last row of a 3×3 matrix. Moreover, even though square matrices are used for a filter kernel and an image patch, in other examples one or more of these matrices may be a rectangle.

As previously described, there may be C*K filter kernels in a plurality of filter kernels obtained at 405. At 406, each of such C*K filter kernels may be transformed, such as with a Winograd transform, to obtain a plurality of predetermined transformed filter kernels each in a Winograd basis. Precomputation of filter kernels may be used to reduce latency during real-time processing of input data.

Filter cells 312 of filter kernel 313 may be provided to a Winograd transform for a Winograd filter transform at 314 to obtain a transformed filter kernel 315. Transformed filter kernel 315 may include transformed filter cells 316. Continuing the example of a 4×4 image patch 303, transformed filter kernel 315 may have transformed filter cells U0-U15 sequentially from a first-to-a last row of a 4×4 matrix. Operations with reference to FIG. 3-2 may be for a $GgG^T$ operation in Equation (7).

At 407, such plurality of predetermined transformed filter kernels generated at 406 may be stored, such as in random access memory or other memory of an integrated circuit or other memory of a data processing system. A FPGA, ASIC, or a system formed of multiple IC dies for example may be used.

Because operations 405-407 may be performed prior to any or all of operations 401-404, latency associated with having to perform operations 405-407 may be avoided, as such stored predetermined transformed filter kernels may be generated in advance of processing image input data of an input layer.

Operations with reference to FIGS. 3-1 and 3-2 transform an image patch and a filter kernel or a plurality of filter kernels each to a Winograd basis. With a transformed image patch 305 and a transformed filter kernel 315, or at least corresponding portions thereof for pipelined operations, an element-wise multiplication 324 with both multiplicand and multiplier in a Winograd basis may be performed with reference to FIGS. 3-3 and 4. Operations with reference to FIG. 3-3 may be for an element-wise multiplication operation, namely to obtain a Hadamard product of $GgG^T \odot B^T dB$, in Equation (7). However, rather than a single input channel for a selected image patch, namely a 2D example, two or more input channels for selected image patches, namely a 3D example, may be used.

At 324, element-wise multiplying of a stored transformed filter kernel of a plurality of C*K stored predetermined transformed filter kernels from 407 with a stored transformed image patch from 404 may be performed for a first selected input channel associated with selected image patch at 402 and each of a set of K output channels. This may be subsequently, or concurrently depending upon multiplier resources, followed for a second channel of such input channels for each of such a set of K output channels, and so forth for all such input channels. Each patch of a set of patches for a set of C input channels may thus be processed. Such element-wise multiplying at 324 may then proceed to a second selected image patch, and so on, for multiplication with each of K output channels for each of such C input channels for such second and subsequent selected image patches.

So while element-wise multiplication 324 may produce a product 408 for a selected image patch of an input channel $C_i$ multiplied by a jth output channel of K output channels for subsequent inverse transformation, a more efficient element-wise multiplication at 324 may be used. For purposes of efficiency, such element-wise multiplication 324 may be performed for a selected image patch for all $C_i$ input channels for all K output channels to obtain corresponding products 408, such as corresponding Hadamard products, prior to inverse transformation. In another example, such element-wise multiplication 324 may be performed for a selected image patch of just a $C_i$ input channel for all K output channels to obtain corresponding products 408, such as corresponding Hadamard products, prior to inverse transformation.

Transformed data cells 306 of transformed image patch 305 and transformed filter cells 316 of transformed filter kernel 315 may respectively be provided, as generally indicated with arrows 321 and 322, to multipliers for an element-wise multiplication at 324 to output a transformed filtered patch 325, as generally indicated with arrow 323.

Transformed filtered patch 325 may be a Hadamard product of such an element-wise multiplication 324. Transformed filtered patch 325 may include transformed filtered patch cells 326. Continuing the above example of a 4×4 selected image patch 303, transformed filtered patch 325 may include transformed filtered patch cells 326 from M0-M15 sequentially from a first-to-a last row of a 4×4 matrix.

Optionally, for reasons of efficiency, by element-wise multiplying at 324 each of a plurality of K predetermined transformed filter kernels of 407 with a stored transformed image patch of 404 for each $C_i$ input channel to obtain corresponding products 408, is followed by summing of such products 408 at 409 to obtain a sum or sum patch 410. At 411, an inverse transforming such sum 410 may be performed to obtain a filtered patch 412 for a selected image patch 303. This may be performed for all K output channels. For example, inverse transforms may be performed on sums for 2D patches on an x,y plane for a plane z=0. After finishing with a z=0 plane, operations for z=1 plane may be performed, and so on. In other words, filtered patch 412 is for all K output channels of a selected image patch 303 for at least a $C_i$ input channel, which may include all C input channels. For purposes of clarity and not limitation, processing of a selected image patch 303 for a $C_i$ input channel of C input channels is further described, as such description may be expanded to include inverse transformation at 411, such as a Winograd inverse transformation, of sum patch 410.

For purposes of clarity by way of non-limiting example, as transforms operate on two-dimensional patches a 4×4 patch is assumed. For 4×4 patches on C channels, a transformed size may be 4×4×C. Each filter set after a transform is likewise 4×4×C. An element wise multiplication may be performed on each filter set to obtain a corresponding volume of size 4×4×C. By summing such 4×4×C volume across C, a patch of size 4×4 may be obtained. An inverse transform may be performed on such 4×4 patch to get an inverse patch, namely another patch that's size 2×2. Since there are a K set of filters, an output of size 2×2×K is obtained. However, while an output post inverse transformation is exactly the same as the output would be in a naïve approach, as described above, such output is arrived at more efficiently as described herein.

With reference to FIG. 3-4, transformed filtered cells 326 of transformed filtered patch 325 may be provided to a Winograd inverse transform for a Winograd inverse data transform at 334 to obtain a filtered patch 330 in output data 331. Filtered patch 330 may include filtered patch cells 336. In this example, filtered patch 330 is a 2×2 matrix; however, in other examples this or another size for filtered patch 330 may be used. In this example, filtered patch 330 may include filtered patch cells 336 from Y0-Y3 sequentially from a first-to-a last row of a 2×2 matrix.

Operations with reference to FIG. 3-4 may be for an $A^T$[Hadamard product]A operation in Equation (7). This operation transforms transformed filtered cells 326 from a Winograd basis to an original basis of input data 301 to obtain a block or matrix of convolution results Y, which in this example is Y0-Y3.

For a conventional naïve convolution, a significant amount of multiplier resources and computational power is spent on non-constant multiplications associated with element-wise multiplication. However, referring to FIGS. 3-3 and 3-4, by using a convolution flow 400, such as in the example of a 4×4 image patch, the number of multiplications for an element-wise multiplication 324 may be 16 in comparison to 36 multiplications in a conventional naïve convolution of equivalent scale.

Figures 5A, 5B:
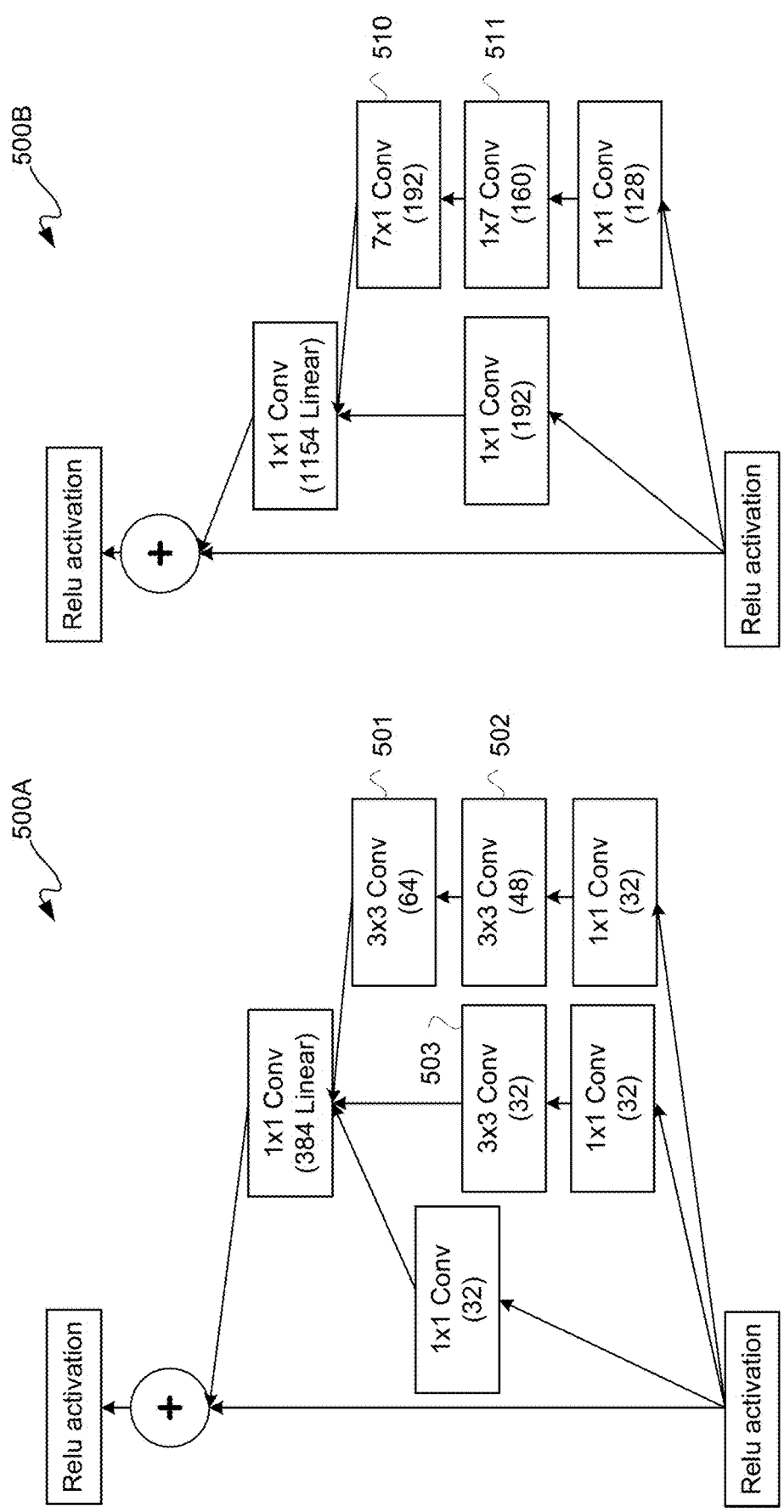
FIGS. 5A and 5B are schematic diagrams of respective inception-residual network models with matrices generated in accordance with transform matrix generation flow of FIG. 6.

While Winograd transforms have be described with matrices of F(2×2,3×3), where 2×2 in refers to the output dimensions. Larger, such as a F(4×4,3×3), which is output size of 4×4 for a 3×3 filter, for example may be used. However, there may be instances where larger matrices and/or non-square matrices may be used. For example, FIGS. 5A and 5B are schematic diagrams of inception-residual network models 500A and 500B, respectively. Inception-residual network model 500A is an example where 3×3 filters are used. In this example, instead of using F(4×4,3×3), an F(6×6, 3×3) for example may be generated.

Inception-residual network model 500B is an example where 3×3 filters are not used. Inception-residual network model 500B, a (7×1) filter and a (1×7) filter are used, which are one-dimensional filters. Winograd transform matrices may be generated for one-dimensional filters, as well as for two-dimensional filters. Moreover, such one- and two-dimensional filters may be generated with enhanced numerical stability, as described below in additional detail.

Figure 6:
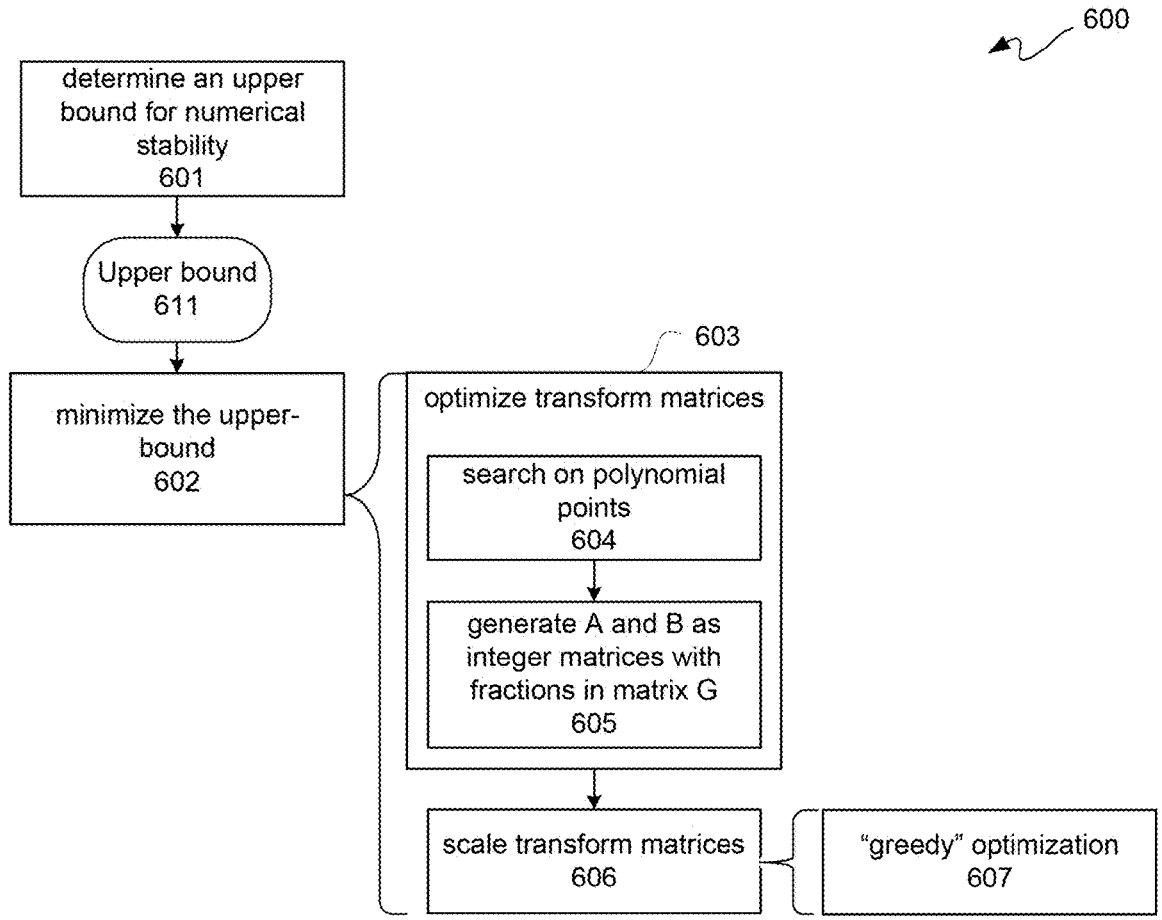
FIG. 6 is a flow diagram depicting an exemplary transform matrix generation flow.

In particular, these are examples of two Inception-ResNet-v2 models having matrices generated in accordance with transform matrix generation flow 600 of FIG. 6. Along those lines, one or more of matrices 501-503 for example of inception-residual network model 500A may be generated to have enhanced numerical stability in accordance with transform matrix generation flow 600 of FIG. 6. Similarly, one or more of matrices 510 and 511 for example of inception-residual network model 500B may be generated to have enhanced numerical stability in accordance with transform matrix generation flow 600 of FIG. 6.

Convolutions in residual connections of inception-residual network models 500A and 500B may be large. Numbers in parenthesis indicate number of convolutions, and matrix convolution dimensions are indicated in the boxes above the parentheticals. In inception-residual network model 500B of FIG. 5B for example, there are a number 7×1 and 1×7 convolutions, which in effect means larger transform matrices.

These or other examples with larger transforms may be used in various applications. Some larger conventional transforms tend to have large or non-integer matrix elements, causing such larger transforms to become computationally intensive operations. For example, multiplication by $\frac{1}{27}$ is difficult in comparison to multiplication by 27, the latter of which may be computed as $(x<<5)-(x<<2)-(x)$. Some larger conventional transforms may have lower numerical stability leading to large errors in an output. This may be more frequent in low-precision applications; however, using low precision is a common power saving technique.

To generate transform matrices for a filter (r×s) and an output size (m×n), for F(m×n, r×s) with good numerical stability, such as in the above-described convolutions, an upper bound on numerical instability, as described below, may be established in order to generate numerically near-optimal transform matrix sets, such for generation of matrices for inception-residual network models 500A and 500B, respectively. Moreover, these matrix sets may be implemented in circuitry, including programmable logic of an FPGA, ASIC, or other circuitry of an IC, with transforms where all values are only integers and all divisions are of powers of two. Along those lines, transforms of such matrix sets may be performed with shift and addition operations, which may be more energy efficient than multiplier operations.

Along those lines, performance of larger convolutions with numerical stability than was conventionally done is described below. Such convolutions may include larger filter sizes and/or larger blocks or matrices of convolution results Y than was conventionally performed with Winograd transforms.

FIG. 6 is a flow diagram depicting an exemplary transform matrix generation flow 600. Transform matrix generation flow 600 may be used to generate more optimal Winograd transform matrices A, B and G.

At 601, an upper bound for numerical stability may be determined. To establish such a criterion, numerical stability of a Winograd transform with respect to changes in input can be upper-bounded by product 611, p, of condition numbers $k_A$, $k_G$, and $k_B$ respectively of individual Winograd transform matrices A, G, and B, namely $p=(k_A \cdot k_G \cdot k_B)$. A condition number of a matrix may be defined as a ratio of the largest to smallest singular value in a singular value decomposition of a matrix as is known. Along those lines, matrix G transforms a filter of filter kernels; transpose matrix $B^T$ of matrix B transforms input data, such as the selected image patch to obtain a transformed image patch; and transpose matrix $A^T$ of matrix A inverse transforms an interim product, or sum of products, to obtain an output. Of course, actual values for condition numbers respectively of Winograd transform matrices A, G, and B may vary with values in such matrices.

At 602, an upper bound 611 may be minimized. In this example, upper bound 611 may be minimized through an optimization of transform matrices A, G, B at 603 followed by a scaling of such optimized transform matrices at 606. Upper bound 611 may generally be thought of as a quality metric for candidate transform matrices A, G, B.

For optimization at 603, a search to obtain polynomial points at 604 may be performed followed by transform matrix generation at 605. Polynomial points are directly used for generating Winograd transform matrices A, G, B. Along those lines, an exhaustive search may be performed at 605 to find a candidate transform matrix A, G, B, namely a candidate set A, G, B.

Upper bound 611 may be used to measure how good a candidate transform matrix A, G, or B is. After locating or finding a candidate transform matrix A, G, B at 604, at 605 Winograd transform matrices A, G, and B may be generated as integer-only matrices, and where any and all fractions resulting may be kept in Winograd transform matrix G, namely matrix G may have one or more fractions.

After optimization at 603, scaling of optimized Winograd transform matrices A, G, B may be performed at 606. Rows and columns of optimized Winograd transform matrices A, G, B may be scaled to reduce a value of a condition number of such matrices while maintaining mathematical equivalency with a Winograd transform prior to such scaling. In this example, a "greedy" optimization may be performed at 607 to scale optimized Winograd transform matrices A, G, B. Effectively, a condition number is for a problem to be solved involving transform matrices A, G, B, which may be more particularized for a Winograd convolution using transform matrices A, G, $B^T$. Use of a greedy optimization algorithm scales transform matrices to generate new transform matrices A, G, B with a better quality metric, in this example a lower upper bound 611 on a condition number.

Figure 7:
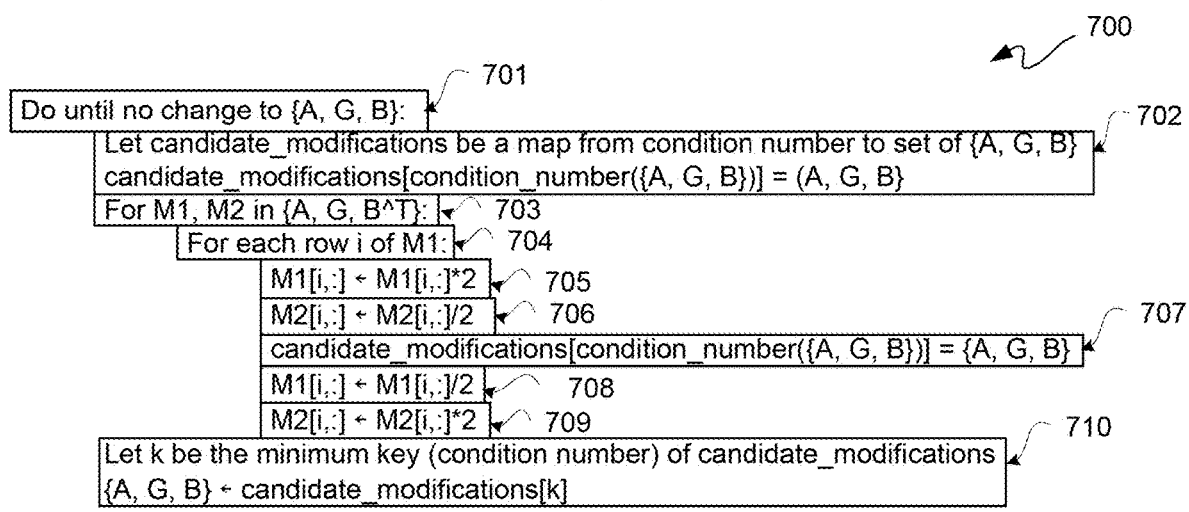
FIG. 7 is a pseudo-code listing depicting an exemplary "greedy" optimization flow.

FIG. 7 is a pseudo-code listing depicting an exemplary "greedy" optimization flow 700. For purposes of clarity by way of example and not limitation, "greedy" optimization flow 700 is for a 1D optimization; however, from such 1D description, 2D and 3D greedy optimizations follow. "Greedy" optimization flow 700 generates various candidates for Winograd transform matrices A, G, $B^T$, and finds an associated A, G, $B^T$ condition number for such matrices.

Generally, for Winograd transform matrices A, G, B for some Winograd convolution, a mapping to minimize an A, G, B condition number may be generated. A condition number indicates how numerically stable a matrix is or matrices are. Therefore, by optimizing for the smallest condition number for transform matrices using various candidates, numerical stability may be enhanced for transform matrices A, G, B.

This optimization may be performed by iteratively making incremental modifications to a current set of transform matrices A, G, $B^T$, and then finding one or more of such modified transform matrices that reduce an associated A, G, $B^T$ condition number, and then re-run same for another iteration until a smallest A, G, $B^T$ condition number is obtained, namely until there is no change in such an A, G, $B^T$ condition number.

At operation 701, transform matrices A, G, B are modified until no change in any of same is generated by operation of lines 702-710. In other words, until transform matrices A, G, B are optimized by "greedy" optimization flow 700. To make it more clear, let the A_o, G_o, B_o be the original candidate found by the exhaustive search. At operation 702, candidate modifications may be mapped from transform matrices A, G, B to condition numbers of such matrices.

At operation 703, a sequence of operations on M1 and M2 row values for M1 and M2 being selected from transform matrices A, G, $B^T$ may begin. In other words, two of three matrices A, G, $B^T$ of a set are processed at a time for each row i of M1 and M2 at 704 for making small modifications to such selected matrices. Transform matrix $B^T$ is just a transposed matrix of transform matrix B. A new candidate may be generated starting at 703. M1 and M2 are all possible tuples that may be generated from (A, G, B). In other words, {M1,M2}=(A,G) or (G,A) or (G,B) or (B,G) or (A,B) or (B,A). Suppose, M1 and M2 is {A,G}, then A and G may be scaled at 705, 706 to obtain a new candidate, with unmodified B, and quality metric associated with such new candidate may be generated at 707.

Operation 705 is for multiplication by 2 for an entire ith row of M1 row values, and operation 706 is for division by 2 for an entire ith row of M2 row values. These operations may be performed for each entire row in selected matrices M1 and M2. By performing these multiply and divide operations, which are inverses of one another, mathematical effect on matrices M1 and M2 may be invariant though an M1 and M2 condition number may be reduced responsive to such incremental changes. In other words, a convolution result using M1 and M2 is not changed by these incremental changes even though a condition number may be changed. Moreover, a value other than 2 for such multiply and divide operations may be used in other examples. However, to maintain values that are integers or integers multiplied by a power of 2, the value 2 was selected for this example for ease of computation in a convolution implemented in programmable logic of an FPGA.

Responsive to such multiplication and division operations, candidate modifications may be set at operation 707 for transform matrices A, G, B. Subsequent operations at 708 and 709 are just the reverse of operations at 705 and 706 with dividing of M1 by 2 followed by multiplying of M2 by 2 in order for more incremental changes for reasons previously described.

To recapitulate, a "greedy" optimization generates new (A, G, B) matrices at 705 and 706 with an original (A_o, G_o, B_o) candidate through row scaling, and saves a new candidate from such scaling in association with an associated quality metric in a list at 707. This process is looped across different rows at 704.

Operation at 710 may be to set a minimum key condition number for candidate modifications to be performed. In this example mapping, there are keys and values for candidates. Keys, k, are mapped to corresponding values. Thus, a mapping from a condition number to a set of transform matrices A, G, $B^T$ that produce such condition number is generated as follows. A minimum condition number may be found by finding a minimum key associated with such condition number. With a minimum key, a corresponding set of transform matrices A, G, $B^T$ may be obtained responsive to such mapping. Along those lines, there may be k modifications, where each $k_j$ modification maps to a set of transform matrices A, G, $B^T$.

In other words, at 710 a search across the list at 707 is used to find the best candidate with the best metric in such list. The new candidate is saved and set as A_o, G_o, B_o. Such process may be repeated with such new candidate as A_o, G_o, B_o.

By keeping modifications to divisions and multiplications by 2, transform matrices A and B may be reduced to integer-only matrices, which may be readily computed for example in programmable logic of an FPGA, a pipeline of a GPU, a multi-core microprocessor, or other integrated circuitry. However, not all of such matrices are sufficiently stable after being scaled. Still lower condition numbers, in some instances 100× lower than conventional Winograd transform matrices, may be obtained while keeping numerical errors small even with low precision numbers or number lengths. Table I below includes examples of reduced condition numbers of Winograd transform matrices A, G, B using "greedy" optimization flow 700 for a 1D version of a Winograd convolution for output size m and filter size r for an FIR filter F, namely F(m, r), where each condition number is a product of matrix condition numbers of transform matrices A, G, B for F(m,r). While some condition numbers may be in excess of 1000, a target of 1000 or less may be used to allow for savings on large transform sizes, such as Inception's 1×7 and 7×1 transforms above for example, while maintaining numerical stability.

TABLE 1

| F(m, r) | r = 1 | r = 2 | r = 3 | r = 4 | r = 5 | r = 6 | r = 7 |
|---|---|---|---|---|---|---|---|
| m = 1 | 1.0 | 1.0 | 3.4 | 5.8 | 25 | 68 | 220 |
| m = 2 | 1.0 | 2.2 | 4.8 | 17 | 43 | 170 | 400 |
| m = 3 | 3.4 | 5.4 | 20 | 43 | 140 | 380 | 1400 |
| m = 4 | 7.8 | 17 | 44 | 110 | 440 | 1200 | 3800 |
| m = 5 | 26 | 45 | 150 | 310 | 1500 | 3000 | 14000 |

FIGS. 8-1 through 8-10 (collectively FIG. 8) are matrix diagrams depicting exemplary sets of transform matrices A, G, B generated in accordance with the above-description of FIGS. 6 and 7, which have sufficient stability. In the FIR or other convolutional functions of FIG. 8, F(2×2,3×3) is used for 3×3 convolutions. The same set of matrices used for F(2,3), can be used for a 1D convolution of filter length of 3. Along those lines, convolution transform circuitry, such as described below in additional detail with reference to FIG. 9, may be configured to implement an FIR or other convolutional function including one or more of transform matrices 801-810.

Again, an m×n size output matrix with a r×s filter matrix may be referred to as an F(m×n, r×s) for an FIR function or other convolutional function. With simultaneous reference to FIGS. 8-1 through 8-10, transform matrices for various F(m×n, r×s)'s having numerical stability of 1000 or less are listed.

Transform matrices 801 through 804 are for 3×3 filters. Transform matrices A, G, B 801 is for F(4×4, 3×3). Transform matrices A, G, B 802 is for F(5×5, 3×3). Transform matrices A, G, B 803 is for F(6×6, 3×3). Transform matrices A, G, B 804 is for F(7×7, 3×3).

Transform matrices 805 through 808 are for 5×5 filters. Transform matrices A, G, B 805 is for F(4×4, 5×5). Transform matrices A, G, B 806 is for F(2×2, 5×5). Transform matrices A, G, B 807 is for F(3×3, 5×5). Transform matrices A, G, B 808 is for F(5×5, 5×5).

Transform matrices 809 and 810 are for 7×7 filters. Transform matrices A, G, B 809 is for F(2×2, 7×7). Transform matrices A, G, B 810 is for F(3×3, 7×7).

Figure 9:
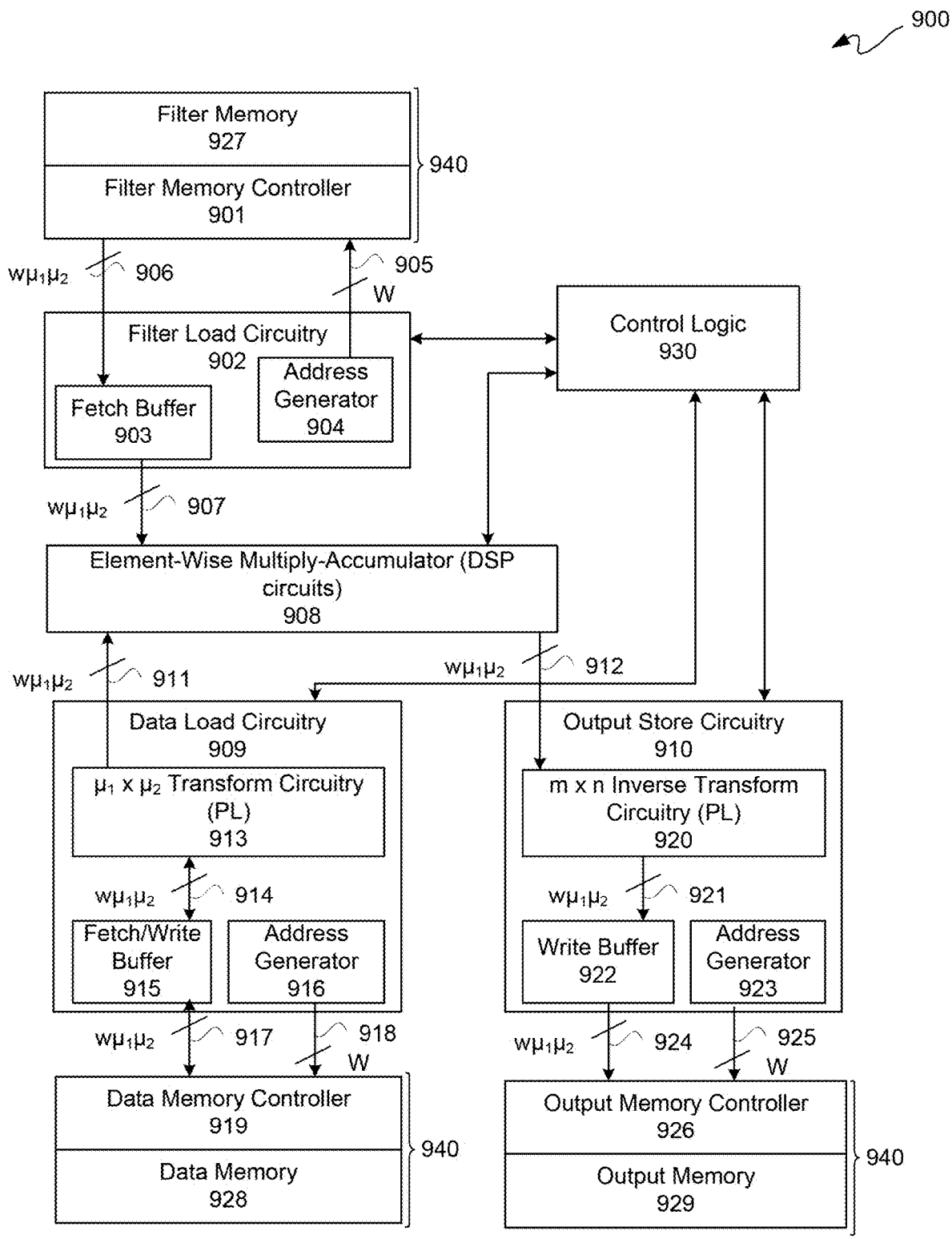

FIG. 9 is a block diagram depicting a convolution system 900. Convolution system 900 is further described with simultaneous reference to FIGS. 1-9.

Convolution system 900 may include three memory controllers, such as for example filter memory controller 901, data memory controller 919, and output memory controller 926. Memory controllers 901, 919, and 926 may correspond to and be in communication with random access memory or other IC memory, such as for example filter memory or memory array 927, data memory or memory array 928, and output memory or memory array 929. Pixel or other data input to a convolution layer may be stored in data memory 928. Accordingly, controllers 901, 919, and 926 and memories or memory spaces/arrays 927-929 collectively may form a memory system 940.

Convolution system 900 may include filter load circuitry 902, control logic 930, element-wise multiply-accumulator ("element-wise MAC") 908, data load circuitry 909 and output store circuitry 910. Control logic 930 may be in bi-directional communication with each of filter load circuitry 902, element-wise MAC 908, data load circuitry 909 and output store circuitry 910 for respective control thereof in accordance with the above description of a Winograd convolution.

An address generator 904 of filter load circuitry 902 may be prompted by control logic 930 to generate addresses. Addresses may be provided from address generator 904 to filter memory controller 901 for reading filter kernel data from filter memory 927. In this example, there is a bus width W of an address bus 905 connected between filter memory controller 901 and address generator 904 for providing such addresses. Likewise, address busses 918 and 925 are each W-bits wide. For example, W may equal 32 in this example; however, in other examples, this or another bit width may be used for addresses.

In response to addresses from address generator 904, filter memory controller 901 may read out filter kernel data from filter memory 927 for providing via data bus 906 to fetch buffer 903 of filter load circuitry 902. In this example, bus width of a data bus 906 is w×$\mu_1$×$\mu_2$-bits wide. Likewise, data busses 907, 911, 912, 914, 917, 921, and 924 are each w×$\mu_1$×$\mu_2$-bits wide. In this example, w is a 16 bit width; however, in other examples, this or another data bus width may be used communicating data.

For purposes of clarity and not limitation, other signals such as data read, data write, and clock signals, among others are not shown for purposes of clarity and not limitation, as these are well-known forms of signals used for reading, writing, and communicating of data for pipelined operation.

Filter kernel data may be buffered in and unloaded from fetch buffer 903 to element-wise MAC 908. Control logic 930 may be used to control operation of element-wise MAC 908 for such multiplication with transform data, as described below in additional detail. As previously described, filter kernel data may be one or more predetermined transformed filter kernels.

Element-wise MAC 908 in this example uses an array of digital signal processing ("DSP") circuits, such as in an FPGA where each of such DSP circuits includes a corresponding multiplier. However, in other examples, this or another form of element-wise multiplication circuitry, including without limitation an array of circuits, may be used to generate Hadamard products.

Under control of control logic 930, address generator 916 of data load circuitry 909 may generate read addresses. Such read addresses generated may be provided via address bus 918 to data memory controller 919. In response to such read addresses, data memory controller 919 may read image data, such as for a convolutional layer, from data memory 928 in the form of one or more selected image patches. These selected image patches may be provided representing $\mu_1$×$\mu_2$, dimensional "chunks" or other segments of image or other data. Such read image data may be provided via data bus 917 to fetch/write buffer 915 of data load circuitry 909.

Read image data may be provided via data bus 914 to $\mu_1 \times \mu_2$ convolution transform circuitry 913 of data load circuitry 909. In this example, convolution transform circuitry 913 may be implemented in programmable logic ("PL") of an FPGA; however, in other examples, ASIC, DSP, multi-core microprocessor, or other circuitry for performing Winograd transforms may be used. Such programmable logic may be configured to provide Winograd transform matrices, such as previously described.

As previously described, an image patch, which may be dimensions $\mu_1 \times \mu_2$, may be transformed, such as with $\mu_1 \times \mu_2$ convolution transform circuitry 913 configured for providing a Winograd data transform, to provide a transformed image patch of an input channel of one or more input channels. Such a transformed image patch may be provided to element-wise MAC 908 via data bus 911 for element-wise multiplication with transformed filter kernels provided via data bus 907 to element-wise MAC 908. Again, control logic 930 may be used for controlling this element-wise multiplication to provide a Hadamard product. Along those lines, transformed filter kernels and a saved transformed image patch may be element-wise multiplied for pipelined operation for multiple filter kernels and for multiple input channels, and such interim products may be accumulated as a sum of partial products. Such an accumulated Hadamard product may be provided from element-wise MAC 908 to m×n inverse convolution transform circuitry 920.

As previously described with reference to FIGS. 3 and 4, optionally a transformed image patch may be stored at 404 for use on each of K output channels of a plurality of output channels. By storing transformed image patch 305, subsequent transforms at 403 may be avoided for multiple output channels. Thus, a first selected input channel selected by selection of an image patch 303 at 402 may be used for all K output channels.

Along those lines, a transformed image patch may be provided via data bus 914 to fetch/write buffer 915 for buffering therein, and such transformed image patch may be unloaded from fetch/write buffer 915 to data memory 928 under control of data memory controller 919 for storing in such data memory 928. A previously transformed image patch may then be read out of data memory, such as previously described; however, a flag or other indicator may accompany such transformed image patch to inform convolution transform circuitry 913 to enter a bypass mode. In a bypass mode, such transformed image patch data may be passed through transform circuitry without being transformed for input to element-wise MAC 908 via data bus 911.

Control logic 930 may be used to control incrementing of input channels and/or output channels for processing filter and image data. Additionally, control logic 930 may be in communication with output store circuitry 910 for processing element-wise multiplication-accumulate results. Along those lines, element-wise products generated by element-wise MAC 908 may be summed over all C input channels, such as previously described. Along those lines, accumulators of element-wise MAC may be used for such summing to provide an accumulated result. Again, there may be a K set of filters, and so there may be K output feature maps. Along those lines, output volume may be x*y*K. For example, if an input is 224×224×3, and there is K set of filter sized 3×3×K, output is 224×224×K, for an instance with x,y dimension of input/output which may be maintained by padding with zeros.

Such an accumulated result may be provided from element-wise MAC 908 via data bus 912 to m×n inverse convolution transform circuitry 920 of output store circuitry 910. In this example, inverse convolution transform circuitry 920 may be implemented in programmable logic ("PL") of an FPGA; however, in other examples, ASIC, DSP, multi-core microprocessor, or other circuitry for performing Winograd inverse transforms may be used. Such programmable logic may be configured to provide Winograd inverse transform matrices, such as previously described, to provide a resultant m×n output matrix block or filtered patch ("resultant output data"), such as previously described.

Resultant output data may be provided from inverse convolution transform circuitry 920 to write buffer 922 of output store circuitry 910 via data bus 921. Write buffer 922 may buffer such resultant output data for subsequent unloading via data bus 924 to output memory 929.

Address generator 923 of output store circuitry 910 may generate addresses provided via address bus 925 to output memory controller 926. Memory controller 926 may receive such addresses via address bus 925 for writing resultant output data on data bus 924 to output memory 929.

In accordance with the above description, control logic 930 may be configured for scheduling operations in accordance with the above description. Along those lines, to recapitulate, filter kernels may be predetermined and transformed for direct element-wise multiplication, namely without passing through transform circuitry for implementation of a Winograd filter transform matrix; transformed image or other data chunks may be written back to data memory for being used at a later time, which may amortize computation costs of performing input transformations of K output channels; and/or element-wise multiply-accumulates may be performed for over C input channels and summed as a summation of interim or partial products before an inverse transform is used to compute a final, m×n resultant output data, on such sum, which may amortize cost of an inverse transform over such C input channels multiplied by K output channels. One or more of these efficiencies may be used with an ability to perform large convolutions using the Winograd transform, which may allow for significant reductions in computational complexity of performing convolutions.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 10 illustrates an FPGA architecture 1000 that includes a large number of different programmable tiles including multi-gigabit transceivers ("MGTs") 1001, configurable logic blocks ("CLBs") 1002, random access memory blocks ("BRAMs") 1003, input/output blocks ("IOBs") 1004, configuration and clocking logic ("CONFIG/CLOCKS") 1005, digital signal processing blocks ("DSPs") 1006, specialized input/output blocks ("I/O") 1007 (e.g., configuration ports and clock ports), and other programmable logic 1008 such as digital clock managers, analog-to-digital converters, system monitoring logic, and so forth. Some FPGAs also include dedicated processor blocks ("PROC") 1010.

In some FPGAs, each programmable tile includes a programmable interconnect element ("INT") 1011 having standardized connections to and from a corresponding interconnect element in each adjacent tile. Therefore, the programmable interconnect elements taken together implement the programmable interconnect structure for the illustrated FPGA. The programmable interconnect element 1011 also includes the connections to and from the programmable logic element within the same tile, as shown by the examples included at the top of FIG. 10.

For example, a CLB 1002 can include a configurable logic element ("CLE") 1012 that can be programmed to implement user logic plus a single programmable interconnect element ("INT") 1011. A BRAM 1003 can include a BRAM logic element ("BRL") 1013 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 1006 can include a DSP logic element ("DSPL") 1014 in addition to an appropriate number of programmable interconnect elements. An IOB 1004 can include, for example, two instances of an input/output logic element ("IOL") 1015 in addition to one instance of the programmable interconnect element 1011. As will be clear to those of skill in the art, the actual I/O pads connected, for example, to the I/O logic element 1015 typically are not confined to the area of the input/output logic element 1015.

In the pictured embodiment, a horizontal area near the center of the die (shown in FIG. 10) is used for configuration, clock, and other control logic. Vertical columns 1009 extending from this horizontal area or column are used to distribute the clocks and configuration signals across the breadth of the FPGA.

Some FPGAs utilizing the architecture illustrated in FIG. 10 include additional logic blocks that disrupt the regular columnar structure making up a large part of the FPGA. The additional logic blocks can be programmable blocks and/or dedicated logic. For example, processor block 1010 spans several columns of CLBs and BRAMs.

Note that FIG. 10 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 10 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method, comprising:
   selecting an image patch from input data for a first channel of a plurality of input channels of an input layer;
   transforming the selected image patch in convolutional transform circuitry to obtain a transformed image patch;
   storing the transformed image patch in memory;
   storing a plurality of predetermined transformed filter kernels in the memory;
   element-wise multiplying, in an element-wise multiply accumulator configured to element-wise multiply, a stored transformed filter kernel of the plurality of stored predetermined transformed filter kernels with the stored transformed image patch for a second channel of the plurality of input channels different from the first channel to obtain a product; and inverse transforming the product, with inverse convolution transform circuitry, to obtain a filtered patch for the selected image patch.

2. The method according to claim 1, wherein:
the transforming is a Winograd transforming; and
the plurality of predetermined transformed filter kernels are for the plurality of input channels for each of a plurality of output channels each in a Winograd basis.

3. The method according to claim 2, wherein the element-wise multiplying is for each of the plurality of stored predetermined transformed filter kernels with the stored transformed image patch to obtain corresponding products.

4. The method according to claim 3, further comprising:
summing the products to obtain a sum patch; and
inverse transforming the sum patch to obtain the filtered patch for the image patch.

5. The method according to claim 4, wherein the products are Hadamard products.

6. The method according to claim 2, further comprising generating Winograd transform matrices for the Winograd transforming.

7. The method according to claim 6, wherein the generating comprises:
determining an upper bound, p, for numerical stability, where p is a product of condition numbers $k_A$, $k_G$, and $k_B$ respectively of matrices A, G, and B for the Winograd transform matrices; and
minimizing the upper bound by:
optimizing the matrices A, G, and B; and
scaling the optimized matrices A, G, and B.

8. The method according to claim 7, wherein:
the matrix G transforms a filter kernel of the plurality of predetermined transformed filter kernels;
a transpose matrix $B^T$ of the matrix B transforms the selected image patch to obtain the transformed image patch; and
a transpose matrix $A^T$ of the matrix A inverse transforms the product to obtain the filtered patch.

9. The method according to claim 8, wherein the optimizing comprises obtaining polynomial points to generate the Winograd transform matrices.

10. The method according to claim 9, wherein the scaling comprises reducing a value of a condition number of the optimized matrices A, G, and B while maintaining mathematical equivalency with the optimized matrices A, G, and B prior to the scaling.

11. The method according to claim 10, wherein the scaling comprises:
generating candidates for the transform matrices A, G, $B^T$; and
finding an associated condition number for the transform matrices A, G, $B^T$.

12. A system for convolution, comprising:
a memory system configured to read out a first transformed filter kernel, a second transformed filter kernel, and image data;
convolutional transform circuitry configured to receive the image data to provide transformed image data;
an element-wise multiply accumulator configured to element-wise multiply:
the first transformed filter kernel and the transformed image data to obtain a first product; and
the second transformed filter kernel and the transformed image data to obtain a second product;
the element-wise multiply accumulator configured to add the first product and the second product to obtain an accumulated sum; and
inverse convolution transform circuitry configured to inverse transform the accumulated sum to provide filtered output data for the image data.

13. The system according to claim 12, wherein the memory system is further configured to write the filtered output data to memory of the memory system.

14. The system according to claim 13, wherein the memory system comprises:
a first controller configured to read out the first transformed filter kernel and the second transformed filter kernel from a first memory space corresponding to the first controller;
a second controller configured to read out the image data from a second memory space and to write in the transformed image data to the second memory space; and
a third controller configured to write the filtered output data to a third memory space.

15. The system according to claim 12, wherein the element-wise multiply accumulator is an array of digital signal processing circuits including corresponding multipliers.

16. The system according to claim 12, wherein the first transformed filter kernel and the second transformed filter kernel correspond to a first input channel and a second input channel.

17. The system according to claim 12, wherein:
the first product and the second product are respective Hadamard products; and
the filtered output data is a filtered patch for the image data being a selected patch of an image.

18. The system according to claim 12, wherein:
the convolutional transform circuitry is configured with Winograd transform matrices for an m×n output matrix and a r×s filter matrix to provide an F(m×n, r×s) convolution function for m, n, r, and s integers;
each of the Winograd transform matrices having a numerical stability of 1000 or less; and
the F(m×n, r×s) convolution function selected from F(5× 5, 3×3), F(6×6, 3×3), F(7×7, 3×3), F(2×2, 5×5), F(3×3, 5×5), F(4×4, 5×5), F(5×5, 5×5), F(2×2, 7×7), or F(3×3, 7×7).

19. The system according to claim 18, wherein the Winograd transform matrices are of an inception-residual network model.

20. The system according to claim 19, wherein the Winograd transform matrices are for a finite impulse response filter as a function of the m×n output matrix and the r×s filter matrix.

* * * * *